United States Patent
Shu

(10) Patent No.: US 6,365,984 B1
(45) Date of Patent: Apr. 2, 2002

(54) APPARATUS FOR CONVERTING ENERGY FROM FLOWING LIQUID

(76) Inventor: Chau-Fu Shu, 2F, No. 3, Alley 5, Lane 76, Chung-Cheng Rd., Hsin-Tien, Taipei Hsien (TW)

( * ) Notice: Subject to any disclaimer, the term of this patent is extended or adjusted under 35 U.S.C. 154(b) by 0 days.

(21) Appl. No.: 09/482,884

(22) Filed: Jan. 14, 2000

(30) Foreign Application Priority Data

Apr. 13, 1999 (CN) .......................................... 88105987

(51) Int. Cl.[7] .......................... F03B 13/10; F03B 13/12; H02P 9/04
(52) U.S. Cl. .......................... 290/53; 290/42; 290/43; 290/54; 290/55
(58) Field of Search .............................. 290/42, 43, 53, 290/54, 55

(56) References Cited

U.S. PATENT DOCUMENTS

| | | | | |
|---|---|---|---|---|
| 3,928,771 A | * | 12/1975 | Straumsnes | 290/43 |
| 3,986,787 A | * | 10/1976 | Mouton, Jr. et al. | 415/7 |
| 4,511,808 A | * | 4/1985 | Jost | 290/54 |
| 4,516,033 A | * | 5/1985 | Olson | 290/54 |
| 4,519,742 A | * | 5/1985 | Van Buytene | 415/7 |
| 4,590,386 A | * | 5/1986 | Wiggs | 290/54 |
| 4,717,831 A | * | 1/1988 | Kikuchi | 290/53 |
| 5,430,332 A | * | 7/1995 | Dunn, Jr. | 290/54 |
| 5,708,305 A | | 1/1998 | Wolfe | 290/54 |
| 5,710,464 A | | 1/1998 | Kao et al. | 290/54 |
| 5,735,665 A | | 4/1998 | Kang | 290/54 |
| 5,770,893 A | | 6/1998 | Youlton | 290/54 |
| 5,789,826 A | | 8/1998 | Kumbatovic | 290/54 |
| 5,808,368 A | | 9/1998 | Brown | 290/54 |

* cited by examiner

Primary Examiner—Elvin Enad
(74) Attorney, Agent, or Firm—Bacon & Thomas, PLLC

(57) ABSTRACT

The present invention relates to an apparatus for converting energy from flowing water (hydraulic turbine). The slidable blades of the apparatus receive the thrust force of flowing water, such that the areas of blades coming into contact with flowing water is maximized. In addition, the blades receive not only the pressure of flowing water, but also the buoyancy of water as the blades are rotated toward the surface of the water so that, by combining these two sources of force, a larger pushing force can be collected. The present invention is suitable of being installed on shores or in rivers, for the purpose of converting energy of flowing water into other kinds of energy, which is to be transmitted in shore for effective use.

9 Claims, 9 Drawing Sheets

APPARATUS FOR CONVERTING ENERGY FROM FLOWING LIQUID

BACKGROUND OF THE INVENTION

1. Field of the Invention

The present invention relates to a device for converting energy from flowing water.

2. Description of the Related Art

The prior art that converts flowing water energy (hydraulic turbine) involves fixed blades that are installed to accept mechanical energy from the pressure of flowing water. The size of this mechanical energy is related to the area of the blades facing a force. Since the blades of a conventional hydraulic turbine have a small area and cannot be enlarged, the dynamic force from the flowing water is limited. Therefore, the converting efficiency to the flowing water of a river is very low. Moreover, it is unable for the conventional water wheel to be adjusted in accordance with the variation of water level. As a result, the conventional apparatus for converting the energy of flowing water is seldom used in rivers.

SUMMARY OF THE INVENTION

A novel converting apparatus for improving the defects of the conventional hydraulic turbine is disclosed in the present invention, which will cause blades to have larger areas when the blades are in a preferred position for receiving force. Therefore, aside from receiving the pressure of flowing water, the blades also receive the buoyancy of the blades. By these two forces, a large thrust force is formed. The floating body in the present invention causes a water wheel to be in a preferred position for receiving force. The apparatus can be installed in rivers or at shores so that the energy of flowing water can be converted effectively into other energy for being further transferred to the shore to be used more effectively.

In the present invention, a floating body that floats on the surface of the water, can be moved with varying water levels so that the water wheel on the floating body is retained at a predetermined height from the water level, i.e. the blades are retained in a preferred position to receive the flowing water force. Therefore, the blades on the water wheel will receive the pressure of flowing water so that the water wheel will generate a torsional force, which can be converted into other kinds of energy through a transmission device. The blades of the water wheel in the present invention are slidable and not firmly fixed, and as the thrust force of the flowing water applied to the blades becomes greater, the total area of the blades will increase, since the thrust force of the flowing water will assist in fully extending the blades of the water wheel. When the force-receiving area of the blades reaches the largest, the blades are to be perpendicular to the direction of flowing water. In addition, as the water wheel rotates, thus causing the blades to leave the water surface, the blades are to slide into the other end of the water wheel, and when reaching the vertical position, the blades receive the thrust force of flowing water and output the thrust force to the water wheel. Obviously, only half the number of the blades is needed. Moreover, since the displacement of the blades is identical to the direction of flowing water, the blades are to receive the floating force of water. As a result, with these two forces that the blades receive, the water wheel generates a larger thrust force.

BRIEF DESCRIPTION OF THE DRAWINGS

The various objects and advantages of the present invention will be more readily understood from the following detailed description when read in conjunction with the appended drawing.

DETAILED DESCRIPTION OF THE PREFERRED EMBODIMENTS

Figure 1:
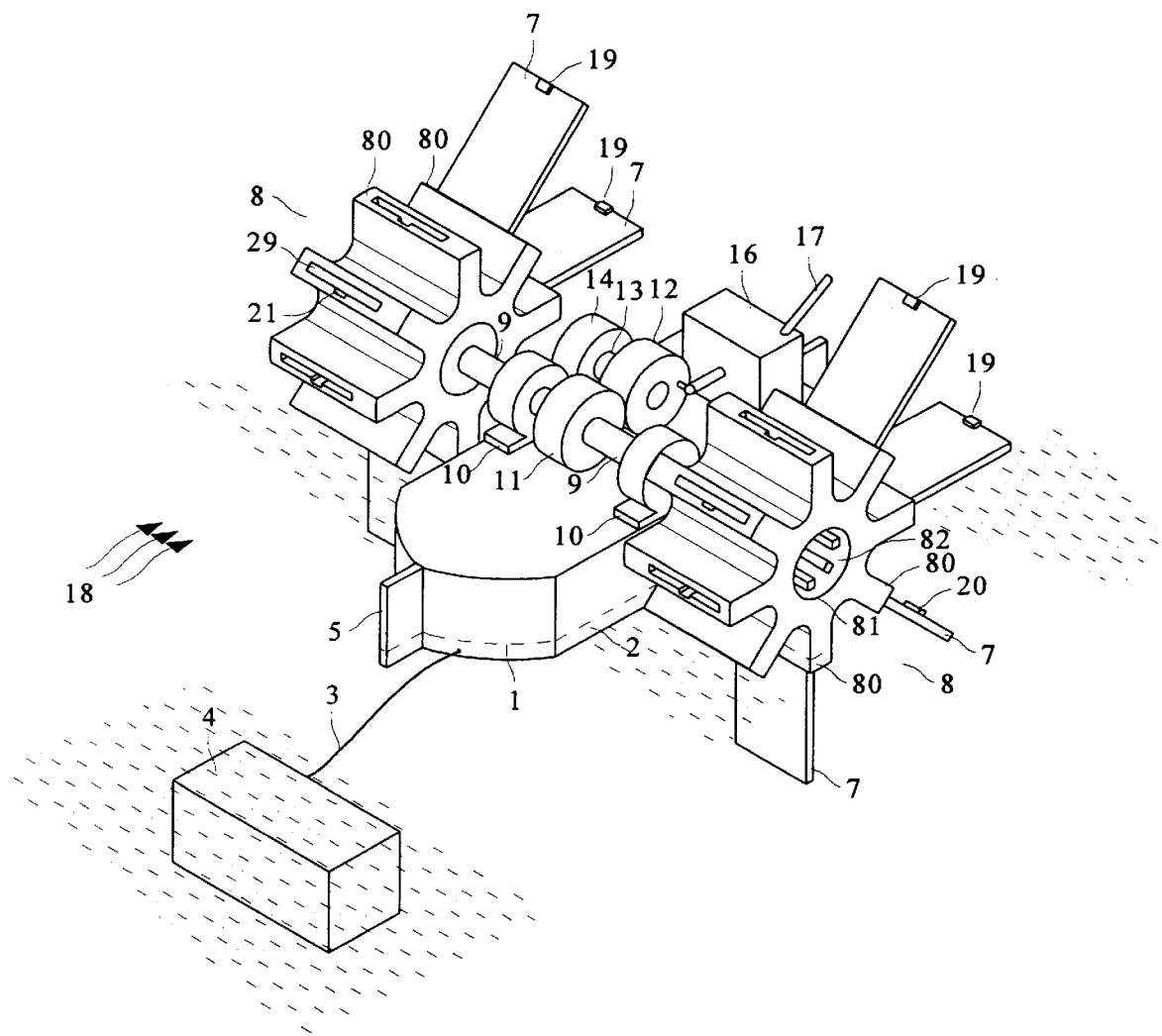
FIG. 1 is a schematic perspective view of a power converting apparatus for flowing water of the present invention.
Figure 2:
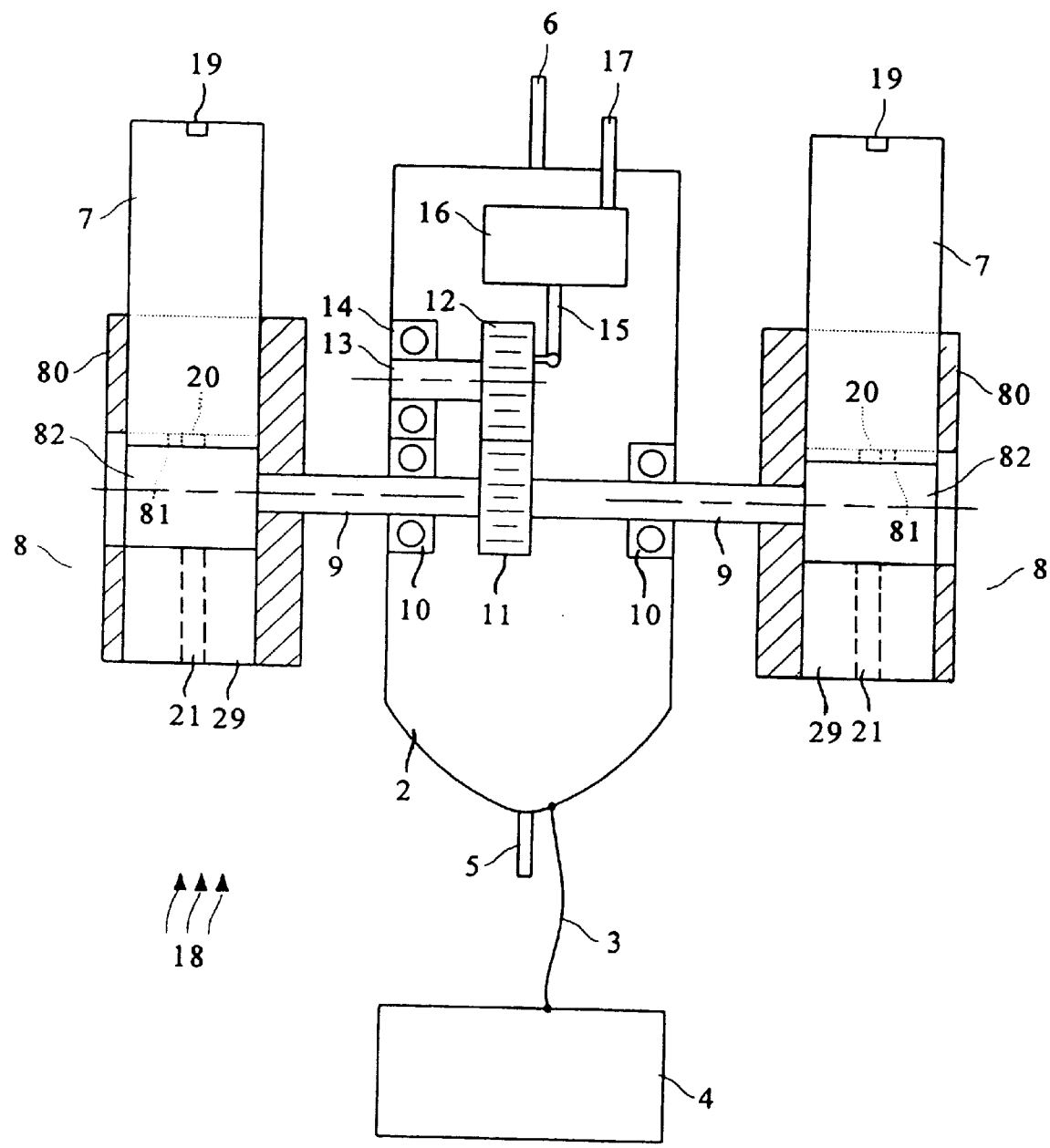
FIG. 2 is a top plan view of the power converting apparatus shown in FIG. 1.
Figure 3:
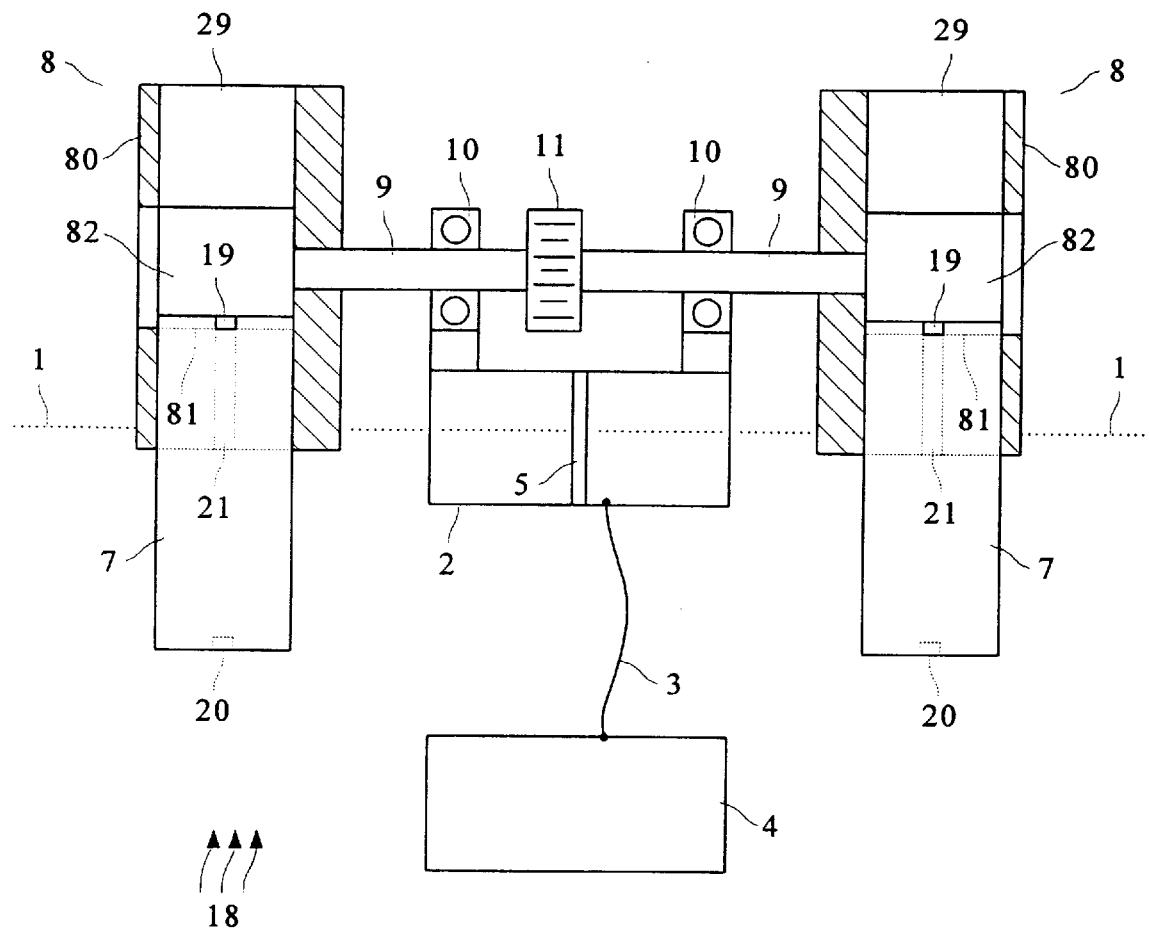
FIG. 3 is a front view of the power converting apparatus shown in FIG. 1.

With reference to FIGS. 1, 2 and 3, the floating body 2 is fixed to a sinking box or block 4 by a rope 3. The sinking block 4 is placed at the lower layer of flowing water as a fixing point. The floating body 2 has an elevation changeable with the level of the flowing water so as to be retained in the water surface 1. The first fixing plate 5 and the second fixing plate 6 are fixed to tops of the front end and the rear end of the floating body 2, respectively, so the orientation of the floating body 2 in the flowing water becomes steadier. Each of two sides of the floating body 2 is installed with a respective water wheel which is fixed to the two ends of the first axle 9. The first axle 9 is supported by the first bearing 10 and is fixed to the floating body 2, thus the water wheel has a rotary axle of the first axle 9 for rotation. The first gear 11, fixed to the first axle 9, is engaged with the second gear 12 that is supported by the second axle 13 and is fixed to the floating body 1 through the second bearing 14. The linkage 15 serves to transfer the dynamic force of the second gear 12 to the pump 16 for generating another kind of dynamically fluid energy (air energy), which is to be outputted through energy-outputting end 17.

Figure 4:
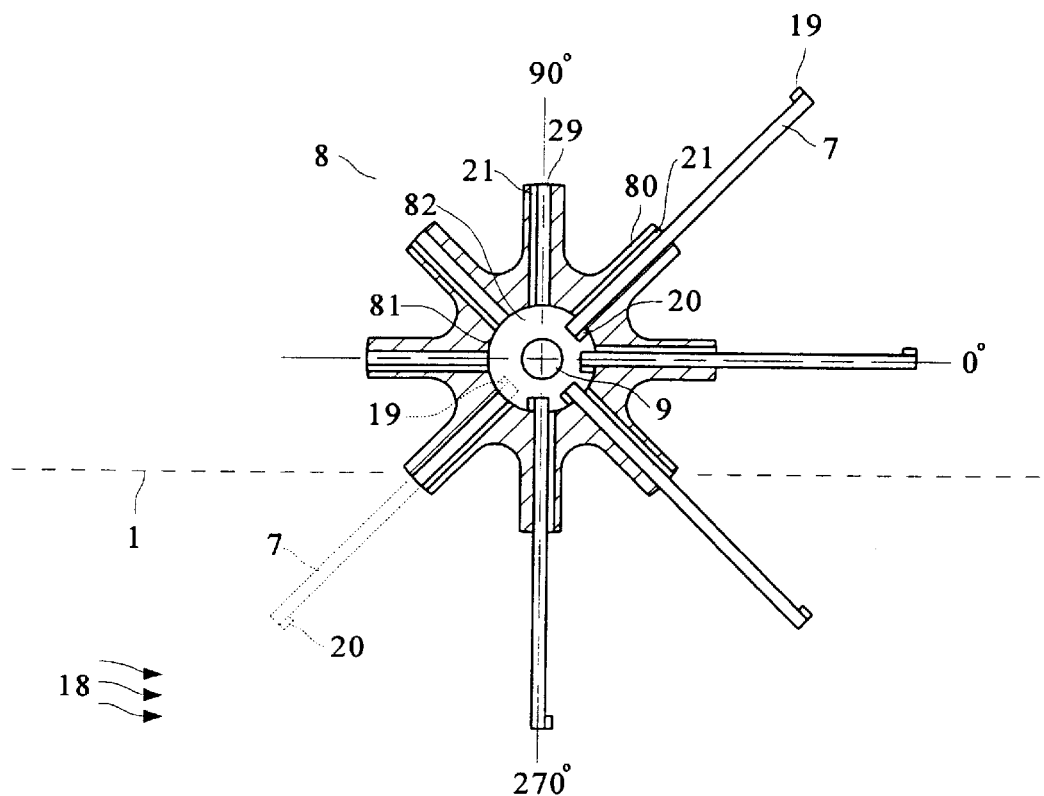
FIG. 4 is a cross-sectional view of a water wheel in the present invention.
Figure 5:
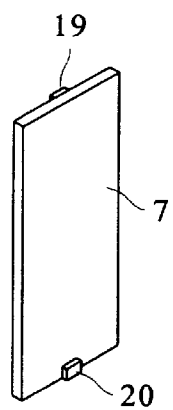
FIG. 5 is a schematic perspective view of one of the blades in the present invention.

In the present invention, the outer rim of the water wheel 8 has a wheel gear shape with a multiple of wheel teeth 80 (there are 8 teeth in drawings). The wheel teeth 80 of water wheel 8 are symmetrically arranged with the axle 9 as the center around the water wheel 8. In the base circle in one of the wheel teeth 80 on the water wheel 8, one lateral side is combined with axle 9, while another-section is a hollow section 29, in which one of the blades 7 glides thereon; half of the wheel teeth 80 of the water wheel 8 holds the blades 7 as shown in FIG. 4. FIG. 5, the schematic perspective view of the blades, then shows that a first block 19 is installed on each of the lateral surface of two ends of the blades 7. The first block 19 rests against the base circle 81 in one of the wheel teeth 80 so that the blades 7 can be prevented from sliding out of the wheel tooth 80. In addition, another lateral surface of the blades 7 includes a second block 20, and a sliding groove 21 is installed on one side of the hollow section 29 so the first or second block 19 or 20 can pass therethrough. Other functions are to be described hereunder.

It is known from the cross-sectional view of the water wheel of FIG. 4 that if a river flows along a direction of the water flow 18, the water level surface 1 is exactly at the lower section of wheel teeth 80. The wheel teeth 80 and the blades 7 will receive the thrust force of the water flow 18 that causes the water wheel 8 to rotate counterclockwise. In addition, the blades 7 rotate to a section above the water level surface (the section is between 270 degrees to 360 degrees), thus receiving the buoyancy of the water. When the blades 7 move higher than the water level surface, they will slide down by gravitational force assume the section is between 0 degree to 90 degrees. Since the wheel teeth 80 are arranged symmetrically, the second blocks 20, the rear end of the blades 7, enter the hollow sections 29 of the opposite one of the wheel teeth 80 and slide out of the sliding grooves 21 and into the water; at this time the first block 19 of the sliding blade 7 is secured at the base circle 81 of the opposite wheel tooth 80, thus preventing the blade 7 from sliding out of the respective wheel teeth 80 (referring to the indented line in FIG. 4). The process repeats itself. The blades 7 only move at one side of the water wheel, i.e. at 270 degrees to a position just above the water surface. Therefore, the blades 7 are to receive two sources of force, and the foregoing forces are to be converted as an effective twisting force of the water wheel 8.

FIG. 9A to FIG. 9E explains further the motions of the wheel teeth 80 and the blades 7. The blades 7 of the water wheel 8 in the present invention are not fixed on wheel teeth 80 or the axle 9, but are moveable (slidable). The main structure of the water wheel 8 includes a plurality of protruding sections (i.e., wheel teeth 80) installed on the edge, and axle 9 installed through the indented section 82 in the water wheel 8. All wheel teeth 80 are arranged symmetrically in accordance with the rotating center of the axle 9, with every wheel tooth extending outwardly and radiantly. The hollow sections 29, perpendicular to the axle 9, are installed within the wheel teeth 80, with the sizes nearly identical to the cross-sectional areas of the blades 7, so the hollow sections 29 are able to contain the blades 7 and enable the blades 7 to slide therewithin. The blades 7 are of flat plates, with the choice of lengths in accordance with the depths of flowing water, and first and second blocks 19 and 20 are installed respectively at both the front and rear ends but different sides. Only on one side inside the hollow sections 29 of the wheel teeth 80 are the sliding grooves 21 installed, therefore the sliding grooves 21 allow only blocks on one side of the blades 7 to pass, with blocks on the other side of the blades 7 being stopped; thus the blocks 19 or 20 on one side of the blades 7 are set up to pass through the sliding grooves 21 of the wheel teeth 80, with the blocks on the other side of the blades 7 passing only the sliding grooves 21 in the opposite wheel teeth 80. Consequently the sliding grooves 21 in the wheel teeth 80 on certain side are installed on the different sides from those in the wheel teeth 80 on the opposite side. The blades 7 are contained in the hollow sections 29 of the water wheel 8; when the water wheel 8 rotates, the blades 7 stay put if they are in the horizontal position, and the blades 7, if in tilted position, slide downwards because of the gravitational force, during which, for the sliding grooves 21 in the wheel teeth 80 are installed in opposite sides, the blocks of the blades 7 on one side can pass but not those on the other side. Therefore the blocks on the other side shall be stuck while the sliding blades 7 are to be contained in the wheel teeth 80 on the other side.

Figure 9B:
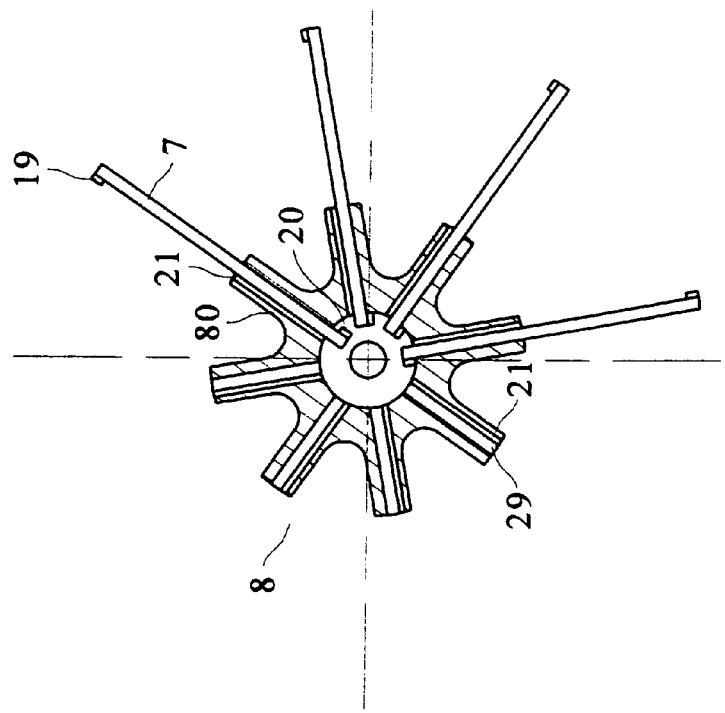
FIGS. 9A to 9E show the various motions of a rotating water wheel being pushed by flowing water.
Figure 9A:
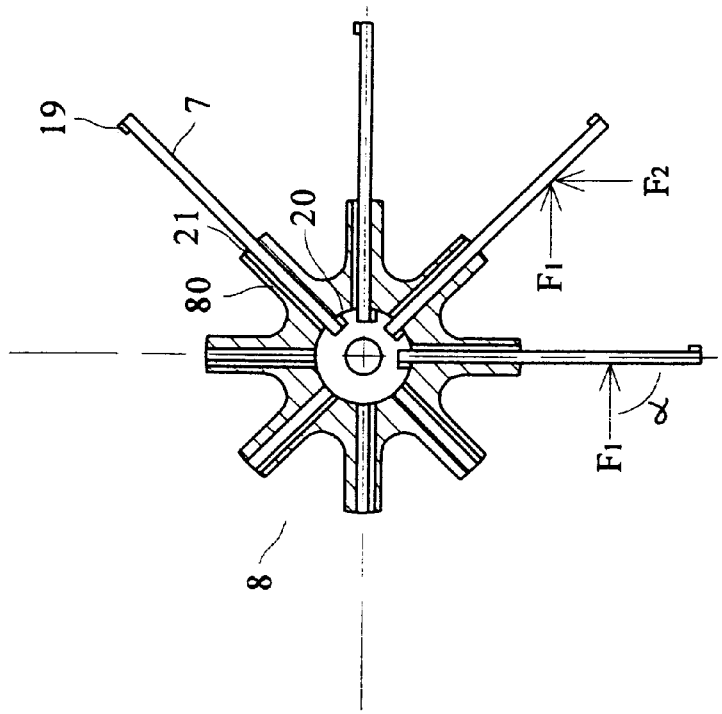
Figure 9D:
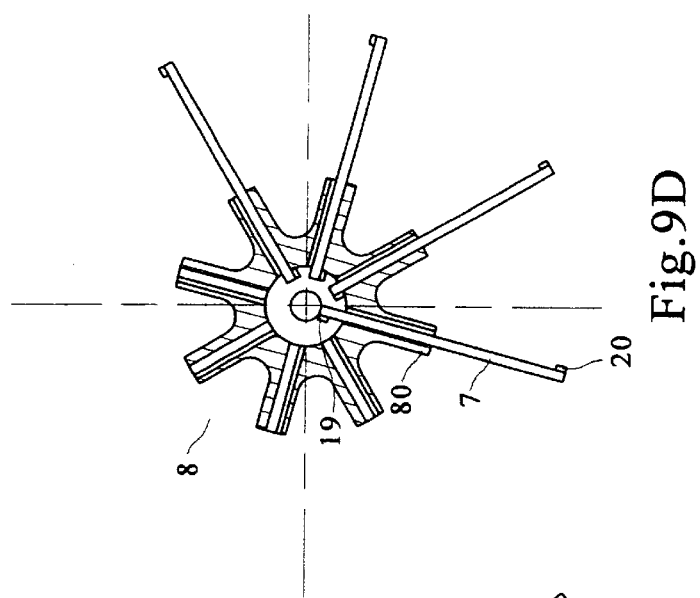
Figure 9E:
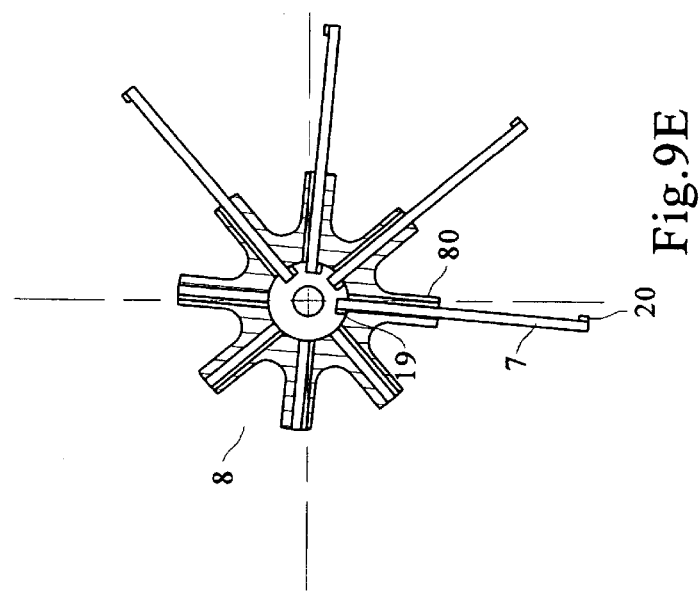
Figure 9C:
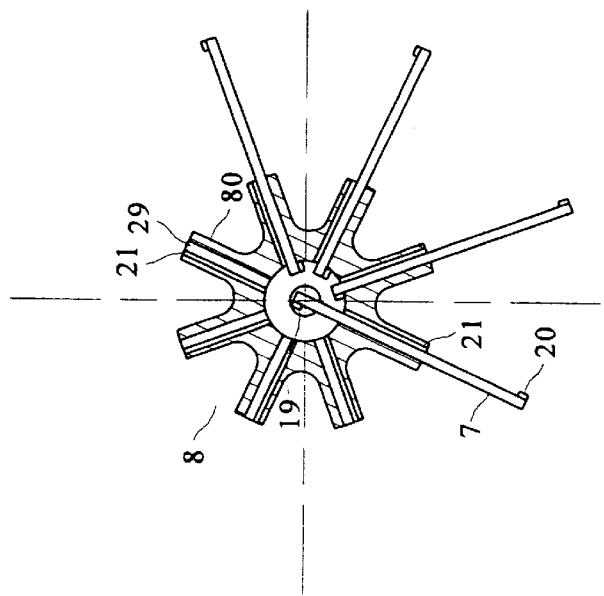

During the rotating process of the water wheel 8, when the blades 7 are lifted away from the water surface and elevated to an appropriate angle (as shown in FIG. 9A), the blades 7, at this angle, shall begin to slide downwards (as shown in FIG. 9B) from the wheel teeth 80 on one side toward the wheel teeth 80 on the opposite side, as the gravitation force of the blades 7 toward the ground becomes larger than the friction force between the blades 7 and the hollow sections 29. As the blades 7 continue to slide because of the gravitation force, the front end of blades 7 shall be out of the wheel teeth 80 and enter into the water (as shown in FIG. 9C to FIG. 9E). At this time the areas of the blades 7 coming into contact with flowing water are to receive the thrust force of flowing water. The blocks 19 at the rear end of the blades 7 are prevented from falling out of the wheel gear 8 since they are not able to pass through the sliding grooves of the wheel teeth 80, as shown in FIG. 4, so the blades 7 are to be stopped from sliding downwards, during which the displacement force of the blades 7 are to reach the maximum (namely the moment when the blades 7, become perpendicular to the water surface, and the blades 7 are extended to the deepest position in the water, and thus having the largest sections in the water, as shown in FIG. 9A), and the rotation of the blades 7 reach the position where they are perpendicular to the direction of flowing water, which is to say, the blades 7 are receiving the largest thrust force from the flowing water.

The foregoing thrust force received by the blades 7 decreases in accordance with the rotating positions of the blades 7, with the value reaching zero when the blades 7 are lifted out of the water surface. And then when the blades 7 of the water wheel 8 are lifted out of the water surface and reach an appropriate angle, they are to slide downwards again and enter into the symmetrically arranged wheel teeth 80 on the opposite side. The foregoing process repeats itself. Obviously the numbers of the blades 7 of the water wheel 8 can only be half of those for the wheel teeth 80, for every blade 7 alternatively slides in and out of the symmetrical wheel teeth 80. Explaining further to avoid any confusion, as shown in FIG. 9A to 9E, because the blades 7 alternatively slide in and out of the symmetrical wheel teeth 80, the exposed blocks on the blades 7 that are in the horizontal position or not being underwater are numbered 19, and the opposite blocks are numbered 20; as for the blades 7 that are underwater, the stopped blocks are numbered 19 and the opposite blocks are numbered 20.

The blades 7 receive the thrust force from the flowing water, so the water wheel 8 is to generate a torsional force; nevertheless, the blades 7 actually receive two sources of force, one is the thrust force F1 from the flowing water, another the floating force F2. As shown in FIG. 9A, it depends on the angles of the blades 7 underwater to receive both or either one of F1 and F2. As for the floating force F2, F2×lever of force=moment of torsional force of the axle 9 (for conventional water wheel devices, moment of torsional force generated from the floating force is to be offset). The directional relationship between the thrust force of flowing water and positions of the blades 7 is represented by F1 Sinα (F1=the thrust force of flowing water, α=the angle between F1 and the blades 7), therefore the thrust force received by the blades 7 from flowing water reaches the maximum when α=90°, as shown in FIG. 9A; in addition, since F1=PA (P=the pressure of flowing water, A=the contacting areas between the blades 7 and flowing water), the areas of the blades 7 underwater directly affect the whole power output.

Figure 6:
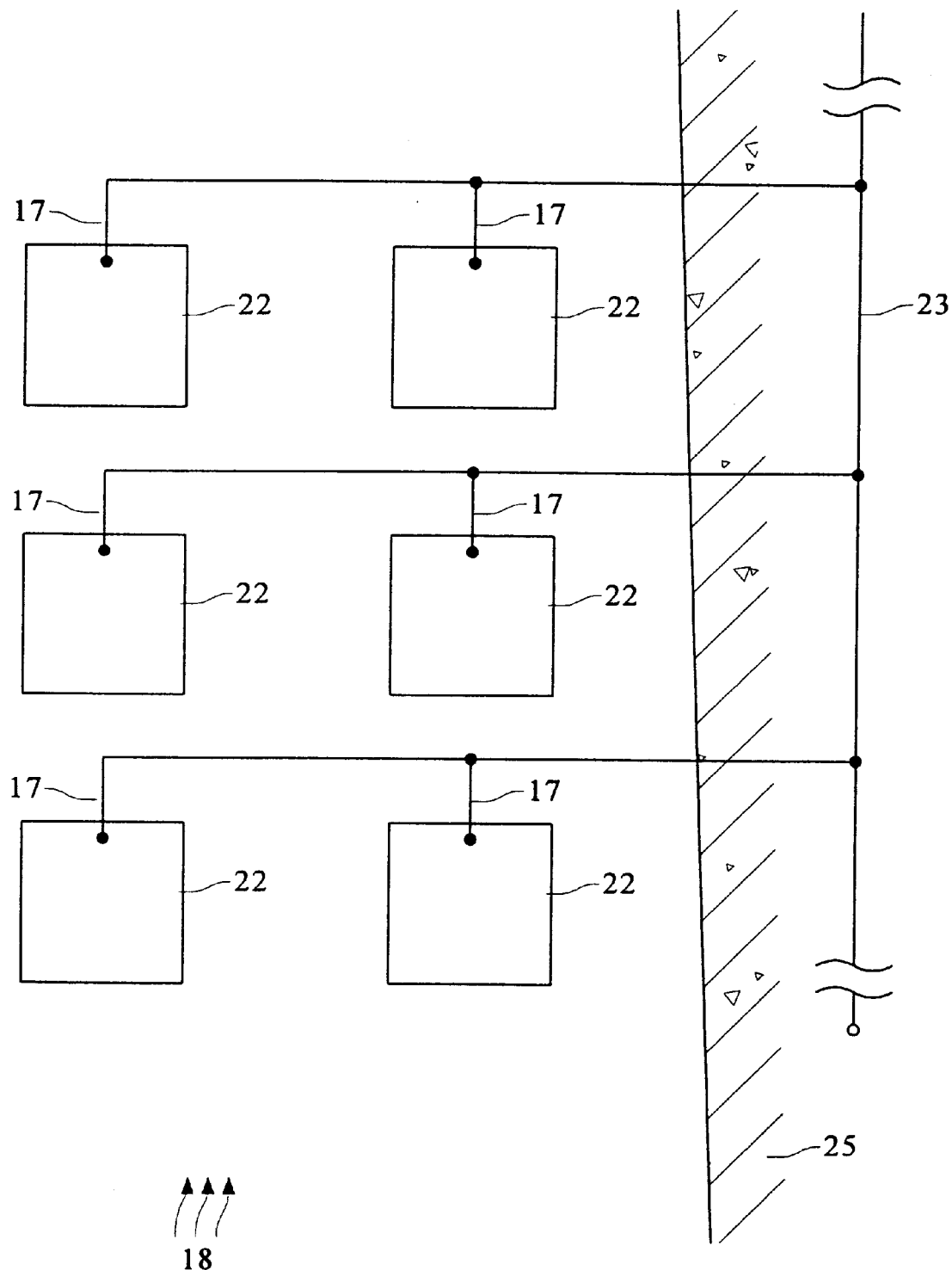
FIG. 6 shows an allocation diagram of the power converting apparatus for flowing water in the present invention.

FIG. 6 shows an allocation diagram of the converting device of flowing water. A multiple of flowing-water energy converters 22 can be installed on a river, with each energy output 17 of every flowing-water energy converter 22 being converged to the fluid-energy converging tube 23 alongside the river for effective use of the energy. The number of flowing-water energy converters 22 can be decided according to various sizes of rivers for efficient installment.

Figure 7:
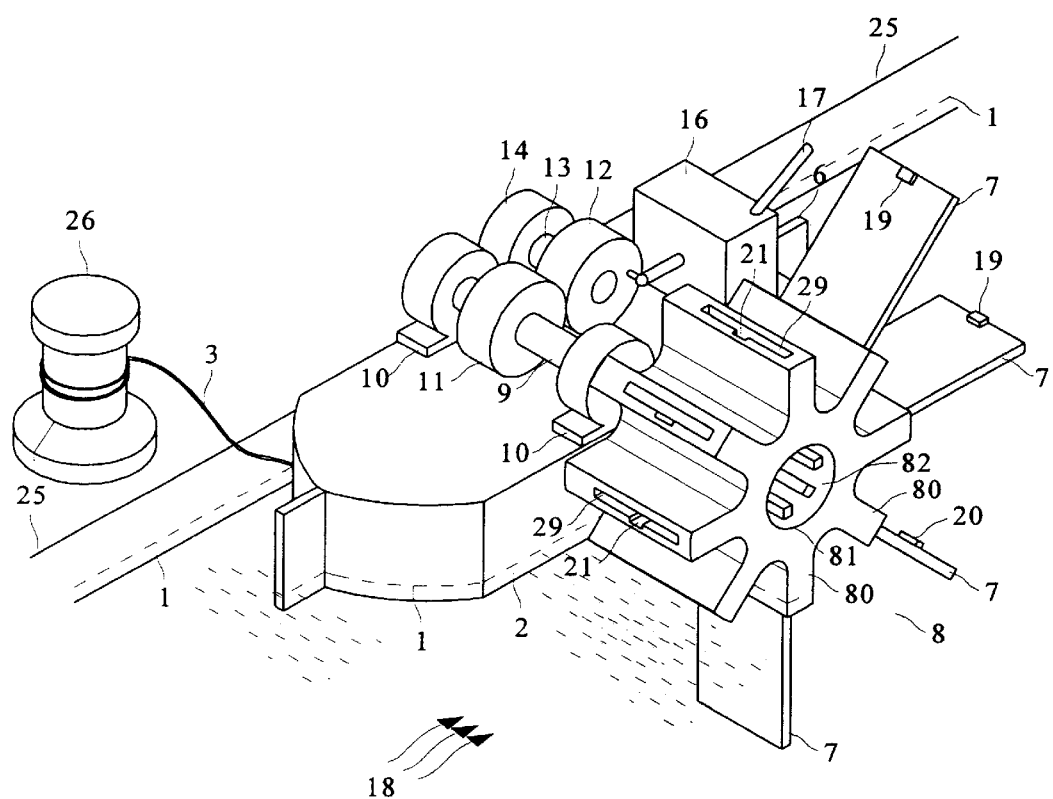
FIG. 7 is a schematic perspective view of a power converting device for flowing water of the present invention deployed at a shore of a river.

FIG. 7 shows a schematic perspective view of water flow energy converting device. When sinking box 4 can not be placed on a river, the floating body 2 can be fixed to the fixing post 26 at the shore 25 of the river 26.

Figure 8:
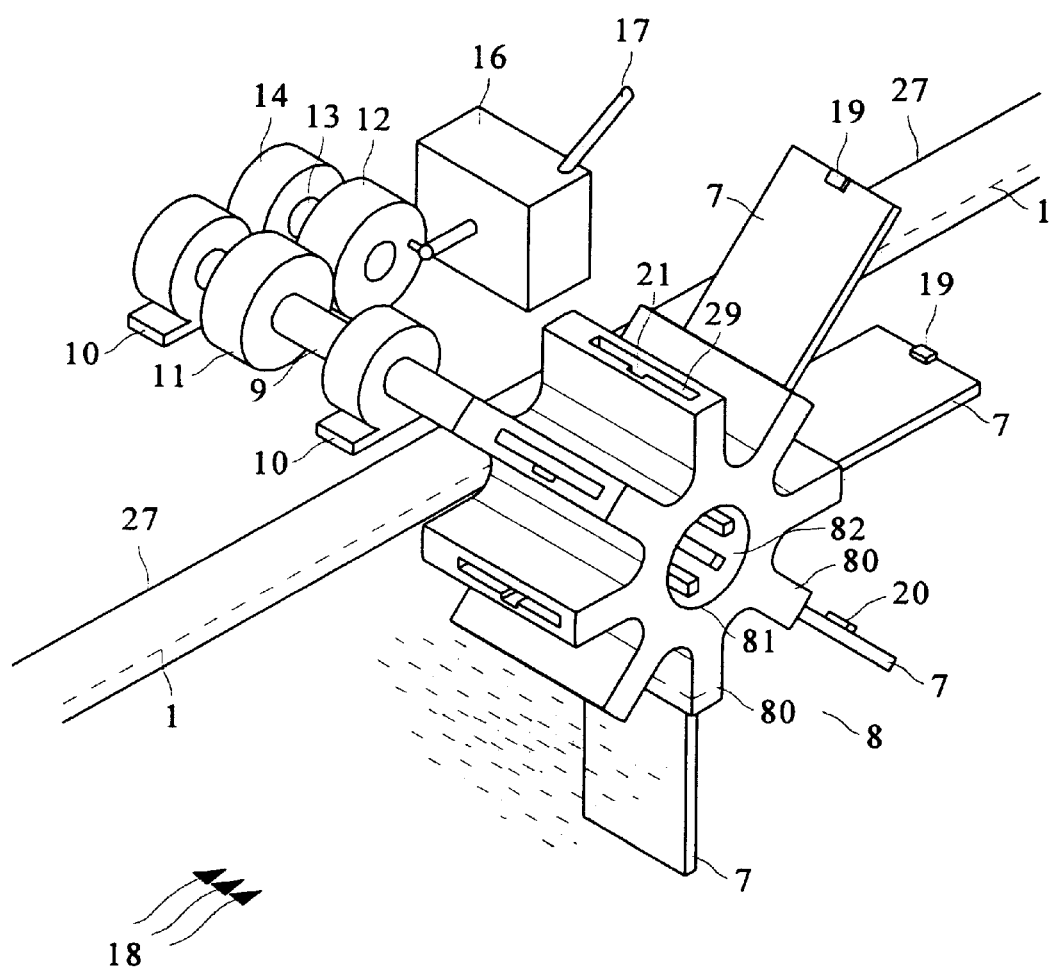
FIG. 8 is a schematic view of a power converting device for flowing water of the present invention deployed at a water channel.

FIG. 8 shows a schematic perspective view of a flowing water energy-converting device used in a small river. For a narrow river or water channel, if the water level can be retained in the predetermined value, the water wheel 8 can be installed at the smaller river 27.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for converting energy from flowing liquid, the apparatus comprising:
    a water wheel having an outer rim and an axial center;
    a wheel axle having a longitudinal axis, the wheel axle attached to the water wheel;
    a transferring set;
    a floating body;
    said water wheel converts energy of a flowing liquid into mechanical energy, which is then converted by said transferring set into transmittable fluid energy or electric energy;
    wherein the outer rim of said water wheel is shaped as a gear with a plurality of wheel teeth which are symmetrically spaced from the longitudinal axis of the wheel axle;
    the wheel teeth comprise hollow sections and sliding grooves;
    half of the wheel teeth each comprises a blade, the blade comprises a first block installed at an end of one side thereof, with a second block installed at another end of another side thereof; and
    said hollow sections of said wheel teeth permit said blades to sequentially and gravitationally slide therein, during which one of said blocks of one said blade can pass into an oppositely facing one of the sliding grooves of another one of said wheel teeth, with the second block of the sliding one of said blades being stopped at a base circle of the slid into one of said wheel teeth, thus permitting the slid one of said blades to receive thrust force of flowing water without completely rotating about the axis of the wheel axle.

2. The apparatus for converting energy from flowing liquid as claimed in claim 1, wherein said water wheel is fixed by said water wheel axle, which is supported by a set of bearings that is fixed to said floating body.

3. An apparatus for converting energy from flowing liquid as claimed in claim 1, wherein said axle of said water wheel connects with said transferring set is comprised of a multiple of gears, whereby the energy of said water wheel is transmitted to a generator or an air pump via the transferring set.

4. An apparatus for converting energy from flowing liquid as claimed in claim 1, wherein positioning plates are installed at the front and rear ends of said floating body.

5. An apparatus for converting energy from flowing liquid as claimed in claim 1, wherein the front end of said floating body is connected with a rope, as said rope is fixed to a sinking box, said water wheels can be installed on two sides of said floating body.

6. An apparatus for converting energy from flowing liquid as claimed in claim 1, wherein the front end of said floating body is connected with a rope fixed to a shore such that said water wheels can be installed on one side of said floating body.

7. An apparatus for converting energy from flowing liquid, the apparatus comprising:
    a water wheel having an outer rim and an axial center;
    a wheel axle having a longitudinal axis, the wheel axle attached to the water wheel;
    a transferring set;
    said water wheel converts energy of a flowing liquid into mechanical energy, which is then converted by said transferring set into transmittable fluid energy or electric energy;
    wherein the outer rim of said water wheel is shaped as a gear with a plurality of wheel teeth which are symmetrically spaced from the longitudinal axis of the wheel axle;
    the wheel teeth comprise hollow sections and sliding grooves;
    half of the wheel teeth each comprises a blade, the blade comprises a first block installed at an end of one side thereof, with a second block installed at another end of another side thereof; and
    said hollow sections of said wheel teeth permit said blades to sequentially and gravitationally slide therein, during which one of said blocks of one said blade can pass into an oppositely facing one of the sliding grooves of another one of said wheel teeth, with the second block of the sliding one of said blades being stopped at a base circle of the slid into one of said wheel teeth, thus permitting the slid one of said blades to receive thrust force of flowing water without completely rotating about the axis of the wheel axle.

8. The apparatus for converting energy from flowing liquid as claimed in claim 7, wherein said water wheel is fixed by said water wheel axle, which is supported by a set of bearings that is fixed to said floating body.

9. An apparatus for converting energy from flowing liquid as claimed in claim 7, wherein said axle of said water wheel connects with said transferring set is comprised of a multiple of gears, whereby the energy of said water wheel is transmitted to a generator or an air pump via the transferring set.

* * * * *